(12) United States Patent
Chong et al.

(10) Patent No.: US 9,299,074 B2
(45) Date of Patent: Mar. 29, 2016

(54) METHOD AND SYSTEM FOR INTEGRATING AUTHENTICATION AND APPROVAL USING ONE BUTTON DIFFERENT BARCODE

(71) Applicant: SK PLANET CO., LTD., Seoul (KR)

(72) Inventors: Ki Won Chong, Goyang-si (KR); Ki Hyun Paek, Goyang-si (KR)

(73) Assignee: SK PLANET CO., LTD., Seoul (KR)

( * ) Notice: Subject to any disclaimer, the term of this patent is extended or adjusted under 35 U.S.C. 154(b) by 0 days.

(21) Appl. No.: 14/391,249

(22) PCT Filed: Jul. 10, 2013

(86) PCT No.: PCT/KR2013/006168
§ 371 (c)(1),
(2) Date: Oct. 8, 2014

(87) PCT Pub. No.: WO2014/017762
PCT Pub. Date: Jan. 30, 2014

(65) Prior Publication Data
US 2015/0081460 A1 Mar. 19, 2015

(30) Foreign Application Priority Data
Jul. 24, 2012 (KR) ........................ 10-2012-0080697

(51) Int. Cl.
*G06Q 20/20* (2012.01)
*G06Q 20/40* (2012.01)
*G06Q 20/06* (2012.01)
*G06Q 20/02* (2012.01)
*G06Q 20/30* (2012.01)
*G06Q 20/36* (2012.01)
*G06Q 20/32* (2012.01)
*G06Q 20/38* (2012.01)
*G06Q 20/42* (2012.01)

(52) U.S. Cl.
CPC ............ *G06Q 20/401* (2013.01); *G06Q 20/027* (2013.01); *G06Q 20/06* (2013.01); *G06Q 20/20* (2013.01); *G06Q 20/204* (2013.01); *G06Q 20/30* (2013.01); *G06Q 20/322* (2013.01); *G06Q 20/36* (2013.01); *G06Q 20/387* (2013.01); *G06Q 20/40* (2013.01); *G06Q 20/407* (2013.01); *G06Q 20/42* (2013.01)

(58) Field of Classification Search
None
See application file for complete search history.

(56) References Cited

U.S. PATENT DOCUMENTS

2011/0246284 A1* 10/2011 Chaikin et al. ............. 705/14.38

FOREIGN PATENT DOCUMENTS

| KR | 1020080044955 A | 5/2008 |
|----|-----------------|--------|
| KR | 1020090010260 A | 1/2009 |
| KR | 1020100031436 A | 3/2010 |
| KR | 1020120046571 A | 5/2012 |

OTHER PUBLICATIONS

International Search Report for PCT/KR2013/006168 dated Sep. 30, 2013.

* cited by examiner

*Primary Examiner* — Shay S Glass
(74) *Attorney, Agent, or Firm* — Hauptman Ham, LLP

(57) ABSTRACT

The present invention relates to a system and method for one button-based heterogeneous barcode integration authentication/approval which is capable of providing a one-button integration authentication/approval service for a heterogeneous barcode with existing barcode authentication affiliated stores infrastructures utilized as they are, and exchanging barcodes of existing gift certificates, coupons, pre-paid cards, credit cards, etc. possessed by a user for heterogeneous barcodes through a gateway operator server.

6 Claims, 6 Drawing Sheets

METHOD AND SYSTEM FOR INTEGRATING AUTHENTICATION AND APPROVAL USING ONE BUTTON DIFFERENT BARCODE

CROSS-REFERENCE TO RELATED APPLICATION

This application claims the benefit of Korean Application No. 10-2012-0080697, filed on Jul. 24, 2012, with the Korean Intellectual Property Office, the disclosure of which is incorporated herein by reference.

BACKGROUND OF THE INVENTION

1. Field of the Invention

The present invention relates to a system and method for one button-based heterogeneous barcode integration authentication/approval, and more particularly, to a system and method for one button-based heterogeneous barcode integration authentication/approval which is capable of providing a one-button integration authentication/approval service for a heterogeneous barcode with existing barcode authentication affiliated stores infrastructures utilized as they are, and exchanging barcodes of existing gift certificates, coupons, pre-paid cards, credit cards, etc. possessed by a user for heterogeneous barcodes through a gateway operator server.

2. Description of the Related Art

With the recent rapid spread of smart phones and increase in speed (3G, LTE, etc.) of mobile communications, various forms of services have been released and commercialized in coupon and settlement markets.

Particularly, an E-wallet service which is downloaded in the form of an application in a smart phone and carries various kinds of coupons, gift certificates, pre-paid cards, credit cards, etc., in the form of a barcode for convenient use with no wallet has been spread and in wide use. For example, E-wallets such as "Smart wallet" of SKP, "Olleh wallet" of KT, "Samsung wallet" of Samsung Group, and other E-wallets of credit card companies, banks and so on have been released and used.

In this manner, services of coupons, gift certificates, cards and so on defined with paper, serial numbers, plastic cards, chip cards and so on in the past are being issued in a variety of E-wallets in the form of a "barcode" without difficulty.

However, as barcode issuers (coupon companies, gift certificates companies, card companies and so on) have been increased indiscriminately, barcode numbers might be overlapped in use of affiliated stores, which may result in poor transaction stability and confusion of users and affiliated stores due to frequent transaction failure.

In addition, there is a need for a technical interlocking of affiliated stores and corresponding POS systems which can use barcodes issued by barcode issuers. That is, even when barcode issuers issue barcodes, there is a difficulty in recruitment of affiliated stores and interlocking with existing POS systems. In addition, barcodes used for settlement are exposed to a risk of copy.

In addition, barcode issuers may take financial burdens and a lot of manpower to construct a separate system for barcode issuance, management and authentication. Moreover, much time and labor have to be taken for independent development of a new POS system and interlocking affiliated store POS server and terminals

RELATED TECHNICAL DOCUMENT

Patent Document

Patent Document 1: Korean Patent Application Publication No. 10-2012-0019964 (Published on Mar. 7, 2012)

Patent Document 2: Korean Patent Registration No. 10-1106285 (Issued on Jan. 18, 2012)

SUMMARY OF THE INVENTION

In order to overcome the above problems, it is an object of the present invention to provide a system and method for one button-based heterogeneous barcode integration authentication/approval which is capable of providing a one-button integration authentication/approval service for a heterogeneous barcode with existing barcode authentication affiliated stores infrastructures utilized as they are.

It is another object of the present invention to provide a system and method for one button-based heterogeneous barcode integration authentication/approval which is capable of exchanging barcodes of existing gift certificates, coupons, pre-paid cards, credit cards, etc. possessed by a user for heterogeneous barcodes, which can be used in affiliated stores providing a one-button integration authentication/approval service, through a gateway operator server.

To achieve the above objects, according to an aspect of the invention, there is provided a one button-based heterogeneous barcode integration authentication/approval system including: a user mobile phone which is installed with an E-wallet application retaining gift certificates and coupons, registers numbers of gift certificates or coupons retained through membership joining to a gateway operator server, and exchanges the registered numbers for heterogeneous barcodes for later use; a gateway operator server which requests a barcode issuer issued gift certificates and coupons requested for exchange by the user mobile phone to determine the validity for the gift certificates and coupons, exchanges an authenticated barcode for a heterogeneous barcode, and transmits the heterogeneous barcode to the user mobile phone; a barcode issuer which checks the validity for the gift certificates and coupons requested for validity authentication by the gateway operator server by comparing numbers of the gift certificates and coupons with barcode data stored in a database, and transmits an authentication result to the gateway operator server; and an affiliated store POS terminal which inputs a one-button service at a request for use of a heterogeneous barcode through the user mobile phone, scans the heterogeneous barcode, requests the gateway operator server to approve the use of the heterogeneous barcode, and settles the corresponding amount of money corresponding to the heterogeneous barcode approved for use, wherein, when an approval of use for the heterogeneous barcode is requested from the affiliated store POS terminal through the one-button service, the gateway operator server checks the validity of the heterogeneous barcode and transmits a result of the use approval to the affiliated store POS terminal.

Preferably, the gateway operator server settles approval contents of a heterogeneous barcode used as sale money of goods sold in an affiliated store and transmits the settled approval contents to the affiliated store and an issuer of a barcode for which the heterogeneous barcode is exchanged.

Preferably, the heterogeneous barcode is an integrated mobile barcode corresponding to a barcode checked for validity authentication by the barcode issuer and includes a prefix identifying the barcode issuer and OTP code information.

Preferably, the barcode issued by the barcode issuer further includes a pre-paid card and a credit card.

According to another aspect of the invention, there is provided a method for one button-based heterogeneous barcode integration authentication/approval in a system including a user mobile phone, a gateway operator server, a barcode issuer and an affiliated store POS terminal, including: 1)

registering numbers of gift certificates and coupons carried in an E-wallet through membership joining to a homepage of the gateway operator server, and then requesting the gateway operator server to exchange the registered numbers for heterogeneous barcodes; 2) requesting the barcode issuer to check the validity for the gift certificates and coupons requested to be exchanged; 3) checking and authenticating a barcode whose validity is requested, by the barcode issuer; 4) exchanging the barcode whose validity is authenticated by the barcode issuer for a heterogeneous barcode; 5) transmitting the heterogeneous barcode to the user mobile phone; 6) at a request for use of the heterogeneous barcode from a user, inputting a one-button service, scanning the heterogeneous barcode, and requesting the gateway operator server to approve the use of the heterogeneous barcode, by the affiliated store POS terminal; 7) checking the validity of the heterogeneous barcode and transmitting a result of the use approval to the affiliated store POS terminal, by the gateway operator server; and 8) settling the amount of money corresponding to the heterogeneous barcode approved for use, by the affiliated store POS terminal.

Preferably, the method further includes: 9) settling approval contents of a heterogeneous barcode used as sale money of goods sold in an affiliated store and transmitting the settled approval contents to the affiliated store and the barcode issuer issuing the a barcode for which the heterogeneous barcode is exchanged, by the gateway operator server.

Preferably, the heterogeneous barcode is an integrated mobile barcode corresponding to a barcode checked for validity authentication by the barcode issuer and includes a prefix identifying the barcode issuer and OTP code information.

Preferably, the barcode issued by the barcode issuer further includes a pre-paid card and a credit card.

The present invention has an advantage in that it provides a one-button integration authentication/approval service for heterogeneous barcodes by utilizing an existing barcode authentication infrastructure as it is under environments where various kinds of barcode-based settlement services (gift certificates, coupons, pre-paid cards, credit cards, social commerce, etc.) are be released with increased spread of smart phones, a service operator operating affiliated stores and gateways need not to construct a new affiliated store infrastructure and can perform business and management for new barcode issuers very easily, and barcode issuers can provide various barcode-based settlement services through existing affiliated stores.

In addition, the present invention has another advantage in that the one-button service of the present invention concentrates communication between various barcode issuers and many affiliated stores on the single gateway operator server to construct an efficient settlement system, thereby allowing the barcode issuers to maximize efficiency of affiliated store business.

In addition, the present invention has another advantage in that the gateway operator server manages the barcode issuers with prefix numbers and integrates and issues heterogeneous barcodes including OTP code information, thereby providing systematic division of goods issued by barcode issuers, efficient use of limited barcode resources and unified security. In addition, users using this service can avoid any inconvenience due to barcode overlapping when the users use affiliated stores.

BRIEF DESCRIPTION OF THE DRAWINGS

The above and/or other aspects and advantages of the present invention will become apparent and more readily appreciated from the following description of the embodiments, taken in conjunction with the accompanying drawings of which.

DETAILED DESCRIPTION OF THE PREFERRED EMBODIMENT

A preferable embodiment of the present invention will now be described in detail with reference to the accompanying drawings.

Figure 1:
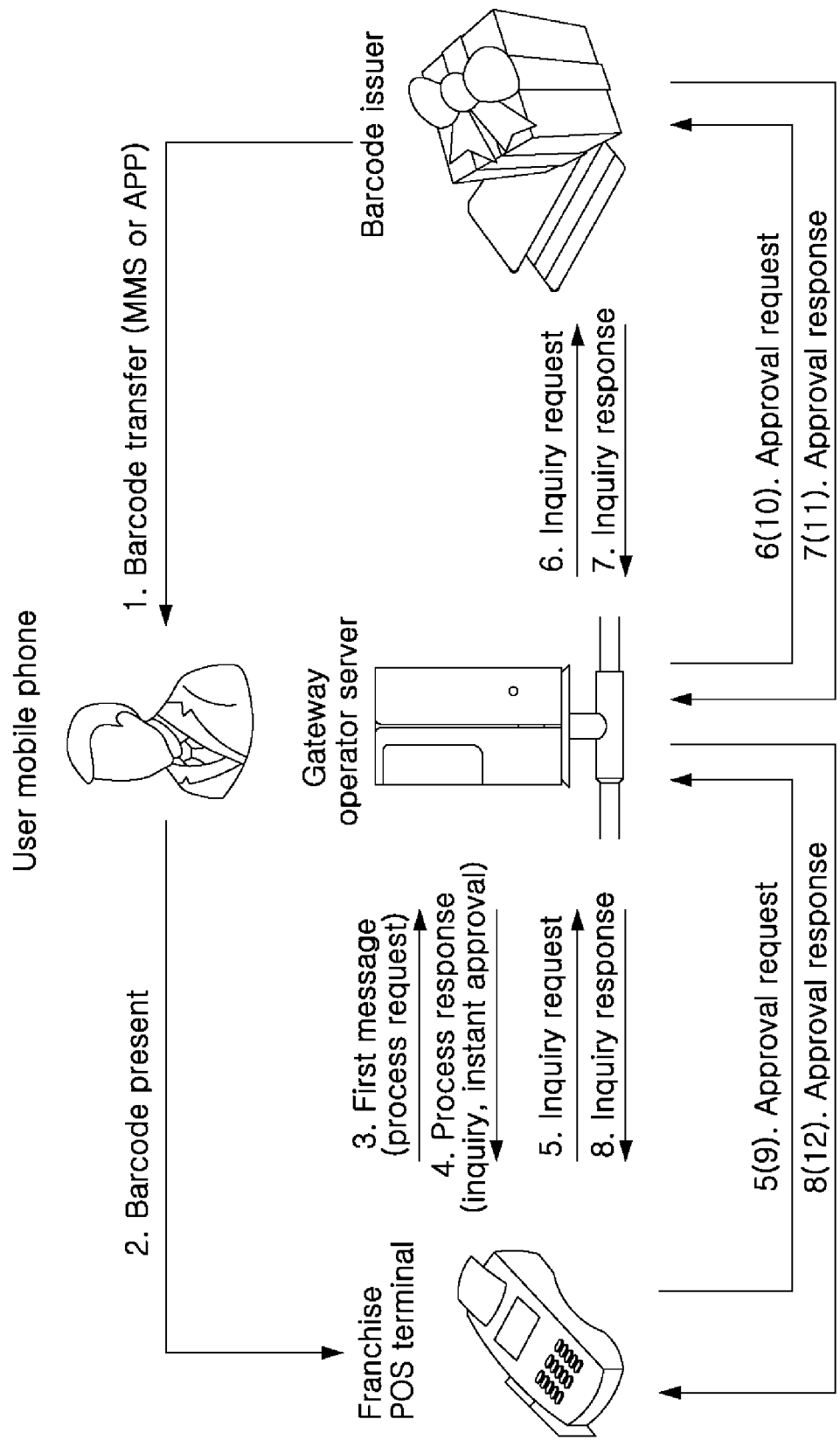
FIG. 1 is a conceptual view schematically showing a configuration of a one button-based heterogeneous barcode integration authentication/approval system according to an embodiment of the present invention.

FIG. 1 is a conceptual view schematically showing a configuration of a one button-based heterogeneous barcode integration authentication/approval system according to an embodiment of the present invention.

Referring to FIG. 1, a one button-based heterogeneous barcode integration authentication/approval system according to an embodiment of the present invention is adapted to be used under environments where various kinds of barcode-based settlement services (gift certificates, coupons, pre-paid cards, credit cards, social commerce, etc.) are be released with increased spread of smart phones, and includes a user mobile phone 10, a gateway operator server 20, a barcode issuer 30 and an affiliated store POS terminal 40.

The user mobile phone 10 is installed with an E-wallet application retaining gift certificates, coupons, etc., registers numbers of gift certificates or coupons retained through membership joining to a homepage (not shown) of the gateway operator server, and exchanges the registered numbers for heterogeneous barcodes for later use.

The gateway operator server 20 requests the barcode issuer 30, which issued gift certificates or coupons requested for exchange by the user mobile phone 10, to determine the validity for the gift certificates or coupons, and exchange an authenticated barcode for a heterogeneous barcode which is then transmitted to the user mobile phone 10.

The barcode issuer 30 checks the validity for the gift certificates and coupons requested for validity authentication by the gateway operator server 20 by comparing numbers of the gift certificates and coupons with barcode data stored in a database through a barcode issuance server (not shown), and transmits an authentication result to the gateway operator server 20.

At a request for use of a heterogeneous barcode through the user mobile phone 10, the affiliated store POS terminal inputs a one-button service, scans the heterogeneous barcode, transmits an integrated message to the gateway operator server 20, requests the gateway operator server 20 to approve the use of the heterogeneous barcode, and settles the corresponding amount of money granted to the heterogeneous barcode approved to use the integrated message.

Here, when an approval of use for the heterogeneous barcode is requested from the affiliated store POS terminal 40 through the one-button service, the gateway operator server 20 checks the validity of the heterogeneous barcode based on heterogeneous barcode issuance information stored in a heterogeneous barcode issuance server (not shown) and transmits a result of the use approval to the affiliated store POS terminal 40.

In addition, the gateway operator server 20 settles approval contents of a heterogeneous barcode used as sale money of goods sold in an affiliated store and transmits the settled approval contents to the affiliated store and an issuer of a barcode for which the heterogeneous barcode is exchanged.

The heterogeneous barcode is an integrated mobile barcode corresponding to a barcode checked for validity authentication by the barcode issuer 30 and includes a prefix identifying the barcode issuer 30 and OTP (One Time Password) code information. The code issued by the barcode issuer 30 further includes a pre-paid card and a credit card. Here, the OTP (One Time Password) code information is well known in the art and, therefore, explanation of which will be omitted.

A process of operation of the one button-based heterogeneous barcode integration authentication/approval system configured as above will now be described with reference to the accompanying drawings.

Figure 2:
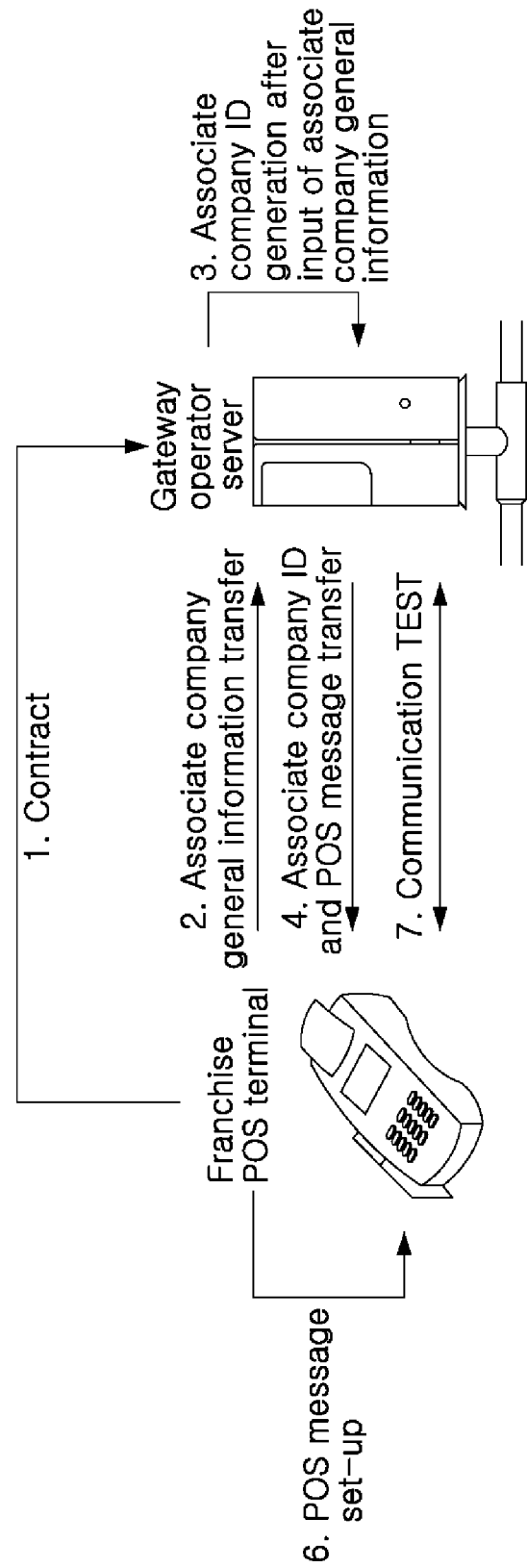
FIG. 2 is a view showing a process of registration and contract by an affiliated store according to an embodiment of the present invention.
Figure 3:
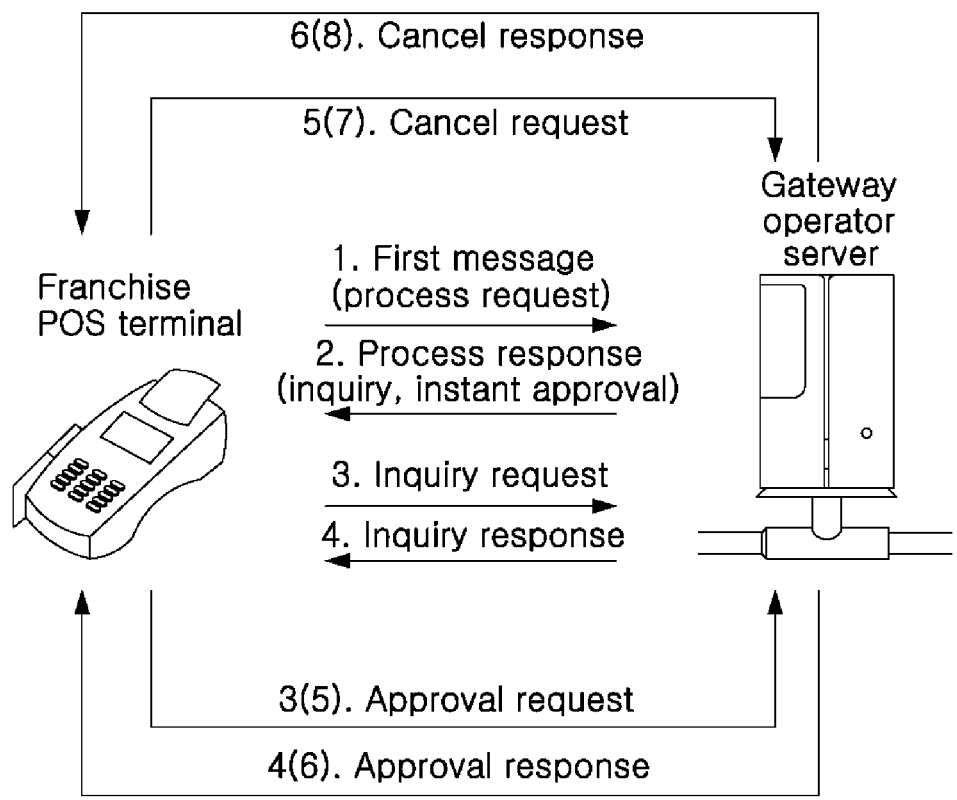
FIG. 3 is a view showing a process of communication between an affiliated store POS terminal and a gateway operator server according to an embodiment of the present invention.
Figure 4:
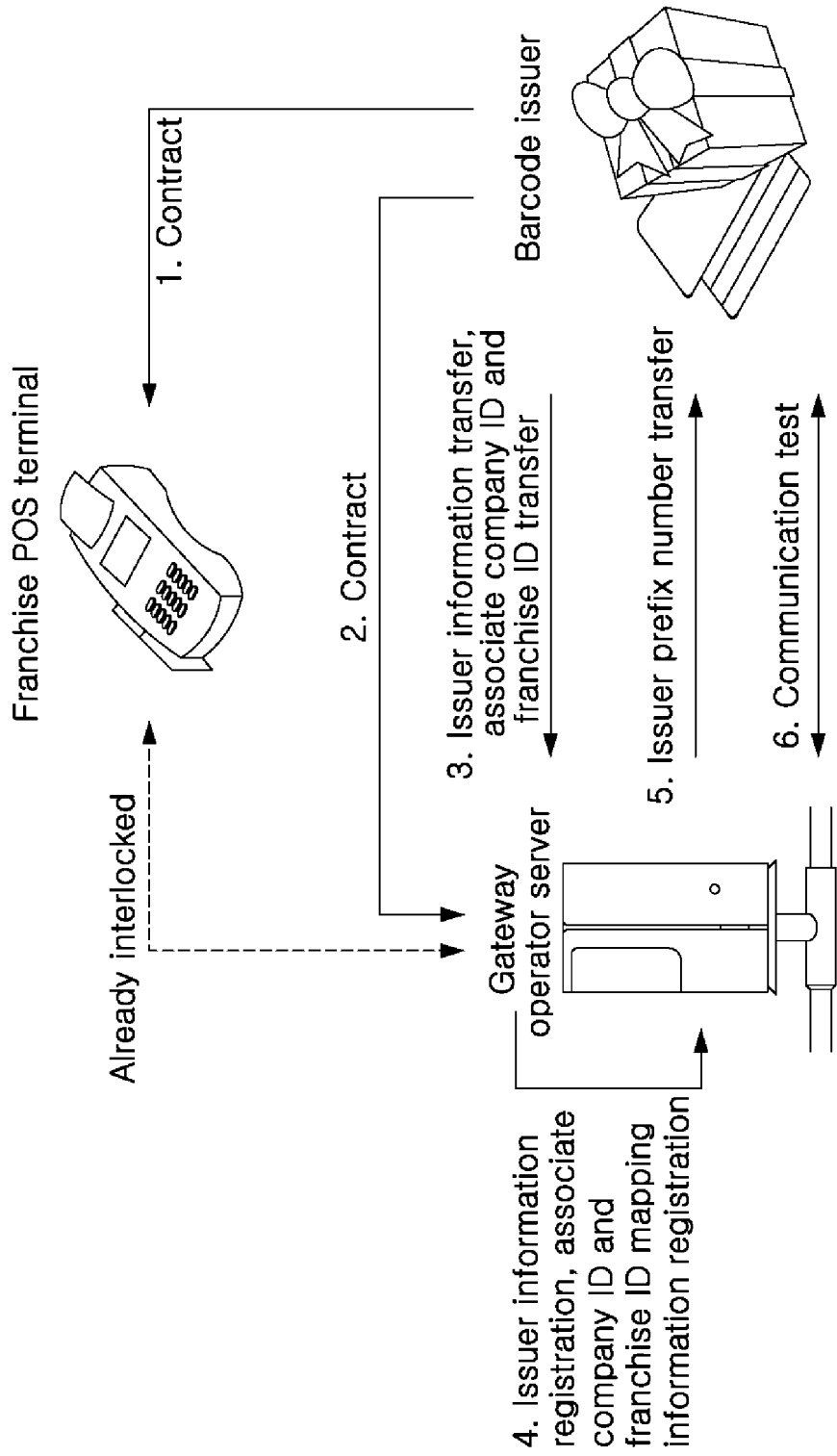
FIG. 4 is a view showing a process of registration and contract by a barcode issuer according to an embodiment of the present invention.
Figure 5:
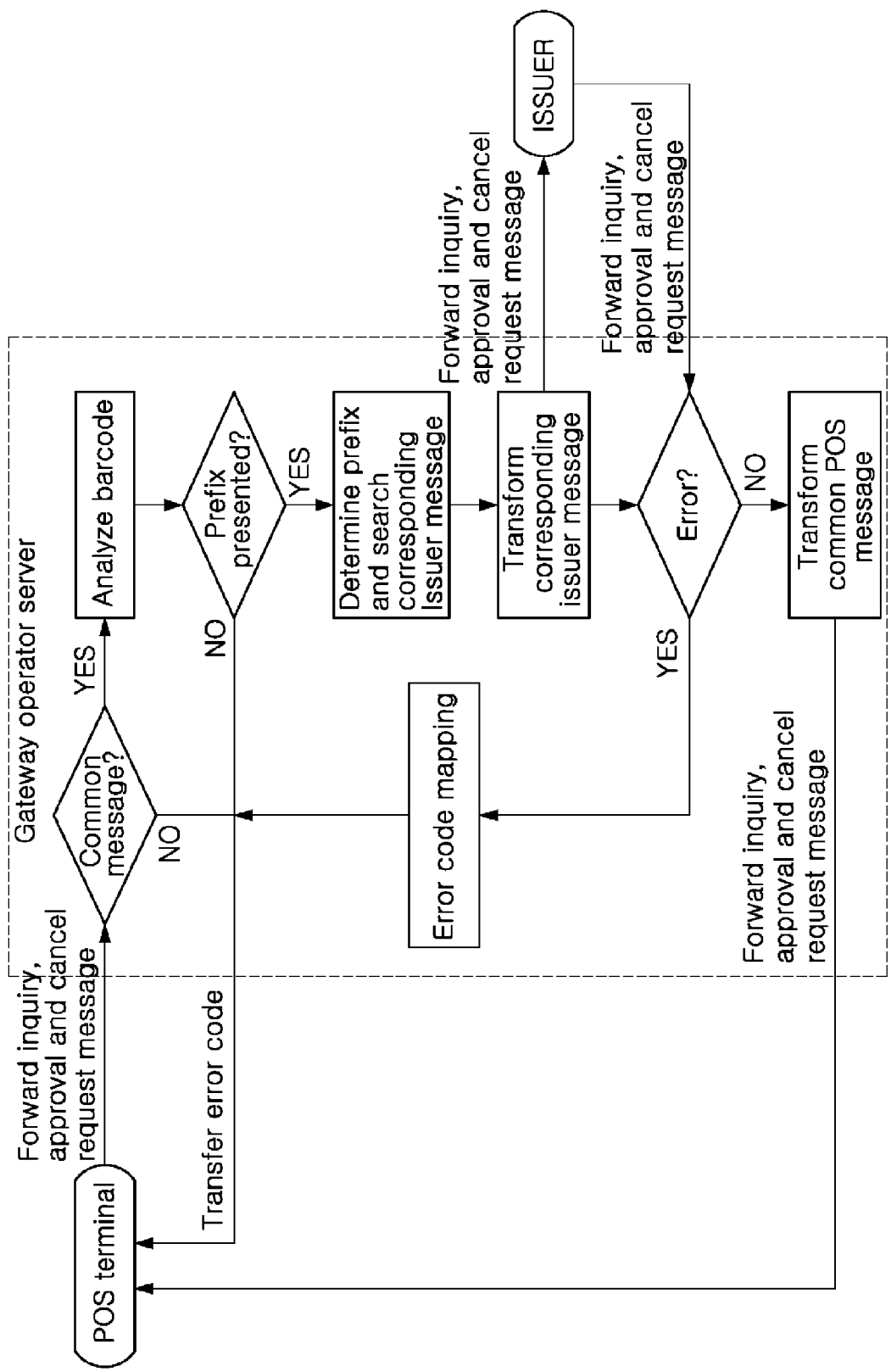
FIG. 5 is a flow chart showing an error code process by a gateway operator server according to an embodiment of the present invention.
Figure 6:
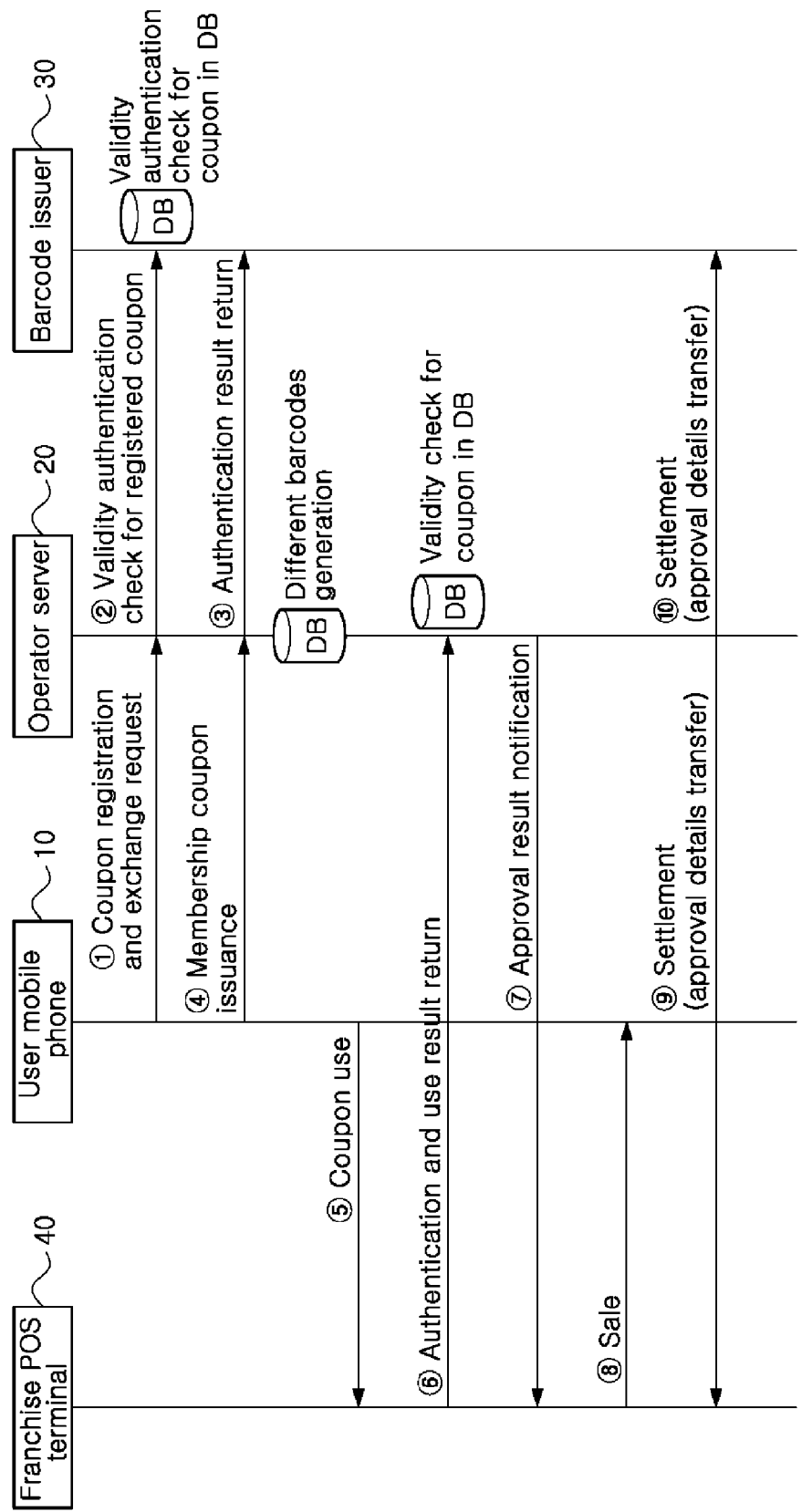
FIG. 6 is a flow diagram showing an operation of a one button-based heterogeneous barcode integration authentication/approval system according to an embodiment of the present invention.

FIG. 2 is a view showing a process of registration and contract by an affiliated store according to an embodiment of the present invention, FIG. 3 is a view showing a process of communication between an affiliated store POS terminal and a gateway operator server according to an embodiment of the present invention, FIG. 4 is a view showing a process of registration and contract by a barcode issuer according to an embodiment of the present invention, FIG. 5 is a flow chart showing an error code process by a gateway operator server according to an embodiment of the present invention, and FIG. 6 is a flow diagram showing an operation of the one button-based heterogeneous barcode integration authentication/approval system according to an embodiment of the present invention.

Referring to FIGS. 2 to 6, the one button-based heterogeneous barcode integration authentication/approval system according to an embodiment of the present invention is adapted to be used under environments where various kinds of barcode-based settlement services (gift certificates, coupons, pre-paid cards, credit cards, social commerce, etc.) are be released with increased spread of smart phones, and generally includes an affiliated store, a barcode issuer, a gateway operator server and a user.

First, the affiliated store refers to a branch office possessed by an associate company. For example, the affiliated store may include a cooperative firm possessing a POS (Point Of Sales) terminal 40 or a franchisor possessing many franchisees each having a POS terminal 40. The affiliated store provides a one-button integration authentication/approval service for heterogeneous barcodes by utilizing an existing barcode authentication infrastructure as it is.

The barcode issuer is a firm or an agency which issues a barcode, progresses an approval procedure and is responsible for on-line settlements of gift certificates, coupons, mobile phones, credit cards, points and so on. The barcode issuer checks the validity of a barcode issued through a barcode issuance server (not shown) and a database and transmits a result of authentication.

The gateway operator server 20 serving as a system for managing communication between the affiliated store and the barcode issuer exchanges barcodes of existing gift certificates, coupons, pre-paid cards, credit cards and so on retained by a user mobile phone for heterogeneous barcodes which can be used in affiliated stores providing a one button-based integration authentication/approval service.

The user receives the one button-based integration authentication/approval service through the affiliated store POS terminal 40. An E-wallet application is installed in the mobile phone 10 possessed by the user whose E-wallet retains gift certificates and coupons. The user registers numbers of gift certificates and coupons retained through membership subscription to a homepage of the gateway operator server 20 and exchanges the registered numbers for heterogeneous barcodes for later use.

Referring to FIG. 2 showing a process of registration and contract by an affiliated store according to an embodiment of the present invention, when an affiliated store making an existing barcode authentication makes a contract with an operator providing the one button-based integration authentication/approval service, the affiliated store delivers the affiliated store general information to the gateway operator server 20. Then, the gateway operator server 20 stores the affiliated store general information in a database, generates an affiliated store ID and delivers a POS message to the affiliated store POS terminal 40. In addition, the affiliated store POS terminal 40 installs the delivered POS message and attempts test communication with the gateway operator server 20 for interlocking of the POS system.

In addition, a billing system may be selected from a usage-based system for charging a service fee per settlement approval in an affiliated store, a percentage-based system for charging a certain percentage of settlement approval amount and a flat rate system for charging a specific amount of money per month.

Here, the affiliated store general information may include a company name, address, representative, business registration number, telephone number and so on. The affiliated store general information may be changed only by a gateway operator and its changed items are stored and managed as history information. In addition, contract billing type information, contract information expiration, contract billing type change and so on may be also changed only by the gateway operator and their changed items are stored and managed as history information in a database. If an affiliated store is newly added, the gateway operator server 20 generates an ID for the new affiliated store and stores and manages it in the database.

Referring to FIG. 3 showing a process of communication between an affiliated store POS terminal and a gateway operator server according to an embodiment of the present invention, when a coupon or a billing barcode is scanned by a reader after inputting one button through the affiliated store POS terminal 40, the affiliated store POS terminal 40 sends an initial message to the gateway operator server 20.

In response to the initial message from the gateway operator server 20, an inquiry or an approval is displayed on a screen of the affiliated store POS terminal 40. If a response with the inquiry is received, an inquiry button is displayed on the screen of the affiliated store POS terminal 40 and an inquiry message is forwarded from the affiliated store POS terminal 40 when a casher presses the inquiry button.

In addition, an approval button is displayed on the screen of the affiliated store POS terminal 40 after a response to the inquiry message. When the casher presses the approval button, an approval message is forward from the affiliated store POS terminal 40 to the gateway operator server 20. When an approval response is received from the gateway operator server 20, all communications are completed to interlock communication between the affiliated store POS terminal 40 and the gateway operator server 20.

Referring to FIG. 4 showing a process of registration and contract by a barcode issuer according to an embodiment of the present invention, the barcode issuer 30 issuing existing barcodes makes a contract with the affiliated store prior to making a contract with the operator providing the one button-based integration authentication/approval service, and makes a single contract or multiple contracts with the gateway operator.

When the barcode issuer 30 delivers the general information and the ID information of the contracted affiliated store to the gateway operator server 20, the gateway operator server 20 registers and stores the general information of the barcode issuer 30 and the affiliated store ID mapping information in a database, generates a prefix number of the barcode issuer 30, delivers a communication message to a barcode issuance server (not shown) of the barcode issuer 30, and attempts test communication for interlocking with the barcode issuance server.

In addition, a billing system makes settlement based on a billing date for each barcode issuance 30 and may be selected from a usage-based system, a percentage-based system, a share type and a unit billing type. The billing settlement is made only for settlement approval in communication between the gateway operator server 20 and the barcode issuer 30.

Here, the general information may include a company name, address, representative, business registration number, telephone number and so on. The general information may be changed only by a gateway operator and its changed items are stored and managed as history information. In addition, contract information expiration, contract billing type change, contract information and so on may be also changed only by the gateway operator and their changed items are stored and managed as history information.

Referring to FIG. 5 which is a flow chart showing an error code process by a gateway operator server according to an embodiment of the present invention, the gateway operator server 20 determines whether a message delivered from the affiliated store POS terminal 40 is an initial message or a common message.

If the delivered message is the initial message, the gateway operator server 20 determines the message as an inquiry request, checks validity by comparing a number of a heterogeneous barcode requested to be inquired with the heterogeneous barcode information stored in a database, and delivers validity inquiry information to the affiliated store POS terminal 40. Such an inquiry service is achieved only by communication between the affiliated store POS terminal 40 and the gateway operator server 20.

If the delivered message is the common message, the gateway operator server 20 analyzes the heterogeneous barcode to determine whether or not there exist a prefix number and a prefix number error. Here, the prefix number is limited by, for example, preceding two digits of a barcode.

If the prefix number is not present or is an unregistered number, the gateway operator server 20 generates an error code and delivers it to the affiliated store POS terminal 40. If the prefix number is an registered number, the requested common message received in the affiliated store POS terminal 40 is converted into a message adapted for each barcode issuer 30 and forwards a message inquiring the validity to the barcode issuer 30.

Upon receiving the message requiring the validity from the gateway operator server 20, the barcode issuer 30 checks the validity by comparing the received message with the barcode information stored in the database, and then delivers an approval or error response message to the gateway operator server 20.

The gateway operator server 20 converts the approval response message received from the barcode issuer 30 into the common message which is then forwarded to the corresponding affiliated store POS terminal 40.

Upon receiving an error response from the barcode issuer 30, the gateway operator server 20 maps an error code of the barcode issuer 30 to an error code of the gateway operator server 20 and delivers the mapped error code to the corresponding affiliated store POS terminal.

Examples of the mapped object information may include affiliated store names, affiliated store management codes and response codes managed by the gateway operator server 20, affiliated store names and affiliated store management codes managed by the barcode issuer, etc.

Referring to FIG. 6 which is a flow diagram showing an operation of the one button-based heterogeneous barcode integration authentication/approval system according to an embodiment of the present invention, a user installs an E-wallet application (for example, Smart wallet, Olleh wallet, Samsung wallet, etc.) carrying various kinds of coupons, gift certificates, pre-paid cards, credit cards and the like in the form of a barcode in the user mobile phone 10, registers numbers of the gift certificates and coupons carried in the E-wallet through membership subscription to a homepage of the gateway operator server 20, and then requests the gateway operator server 20 to exchange the registered numbers for heterogeneous barcodes (first step).

The gateway operator server 20 requests the barcode issuer 30 to check the validity for the gift certificates and coupons requested to be exchanged (second step), and the barcode issuer 30 checks the validity by comparing the barcode requested to be checked for the validity with barcode data stored in a database and sends a result of authentication to the gateway operator server 20 (third step).

The gateway operator server 20 exchanges the barcode whose validity is authenticated by the barcode issuer for a heterogeneous barcode which is then sent to the user mobile phone 10 (fourth and fifth steps).

At a request for use of the heterogeneous barcode from the user, the affiliated store POS terminal 40 inputs a one-button service, scans the heterogeneous barcode, and requests the gateway operator server 20 to approve the use of the heterogeneous barcode (sixth step).

The gateway operator server 20 checks the validity of the heterogeneous barcode and transmits a result of the use approval to the affiliated store POS terminal 40 (seventh step). The affiliated store POS terminal 40 settles the amount of money corresponding to the heterogeneous barcode approved for use (eighth step).

The gateway operator server 20 settles approval contents of a heterogeneous barcode used as sale money of goods sold in an affiliated store and transmits the settled approval contents to the affiliated store and the barcode issuer 30 issuing the a barcode for which the heterogeneous barcode is exchanged (ninth step).

The one-button service of the present invention concentrates communication between various barcode issuers 30 and many affiliated stores on the single gateway operator server 20 to construct an efficient settlement system, thereby allowing the barcode issuers 30 to maximize efficiency of affiliated store business.

In addition, the gateway operator server 20 manages the barcode issuers 30 with prefix numbers and integrates and issues heterogeneous barcodes including OTP code information, thereby providing systematic division of goods issued by barcode issuers, efficient use of limited barcode resources and unified security. In addition, users using this service can avoid any inconvenience due to barcode overlapping when the users use affiliated stores.

As described above, since the present invention provides a one-button integration authentication/approval service for heterogeneous barcodes by utilizing an existing barcode authentication infrastructure as it is under environments where various kinds of barcode-based settlement services (gift certificates, coupons, pre-paid cards, credit cards, social commerce, etc.) are be released with increased spread of smart phones, a service operator operating affiliated stores and gateways need not to construct a new affiliated store infrastructure and can perform business and management for new barcode issuers very easily, and barcode issuers can provide various barcode-based settlement services through existing affiliated stores.

While the present invention has been particularly shown and described with reference to exemplary embodiments thereof, it will be understood by those skilled in the art that various changes in form and details may be made therein without departing from the spirit and scope of the present invention. The exemplary embodiments are provided for the purpose of illustrating the invention, not in a limitative sense. Thus, it is intended that the present invention covers the modifications and variations of this invention provided they come within the scope of the appended claims and their equivalents.

What is claimed is:

1. A heterogeneous barcode integration authentication/approval system, comprising:
    a user mobile device;
    a gateway operator server;
    a barcode issuer; and
    an affiliated store POS terminal,
    wherein
    the user mobile device is installed with an E-wallet application, configured to
        retain gift certificates and coupons,
        register numbers of the retained gift certificates or coupons through a membership joining to the gateway operator server, and
        request an exchange of the registered gift certificates or coupons for heterogeneous barcodes;
    the gateway operator server is configured to
        request the barcode issuer, which issued the gift certificates or coupons requested for exchange by the user mobile device, to authenticate validity of the gift certificates or coupons,
        exchange the gift certificates or coupons having the validity authenticated by the barcode issuer for the corresponding heterogeneous barcodes, and
        transmit the heterogeneous barcodes to the user mobile device;
    the barcode issuer is configured to
        check the validity for the gift certificates or coupons requested for validity authentication by the gateway operator server, by comparing the registered numbers of the gift certificates or coupons with barcode data stored in a database, and
        transmit an authentication result to the gateway operator server; and
    the affiliated store POS terminal is configured to, in response to a request for use of a heterogeneous barcode from the user mobile device,
        scan the heterogeneous barcode,
        request the gateway operator server to approve the use of the heterogeneous barcode, and
        settle a corresponding amount of money corresponding to the approved heterogeneous barcode,
    wherein, when an approval for use of the heterogeneous barcode is requested from the affiliated store POS terminal, the gateway operator server is configured to check the validity of the heterogeneous barcode and transmit a result of the use approval to the affiliated store POS terminal, and
    wherein the heterogeneous barcode is an integrated mobile barcode corresponding to one of the authenticated gift certificates or coupons, and includes a prefix identifying the barcode issuer and One Time Password (OTP) code information.

2. The system according to claim 1, wherein the gateway operator server is configured to
    settle approval contents of a heterogeneous barcode used as sale money of goods sold in an affiliated store and
    transmit the settled approval contents to the affiliated store and the barcode issuer of the exchanged gift certificates or coupons.

3. The system according to claim 1, wherein the gift certificates or coupons include a pre-paid card and a credit card.

4. A method for heterogeneous barcode integration authentication/approval in a system including a user mobile device, a gateway operator server, a barcode issuer and an affiliated store POS terminal, the method comprising:
    registering, by the user mobile device, numbers of gift certificates and coupons carried in an E-wallet through membership joining to the gateway operator server;
    requesting, by the user mobile device, the gateway operator server to exchange the registered gift certificates or coupons for heterogeneous barcodes;
    requesting, by the gateway operator server, the barcode issuer, which issued the gift certificates or coupons requested for exchange by the user mobile device, to authenticate validity of the gift certificates or coupons;
    checking, by the barcode issuer, the validity for the gift certificates or coupons requested for validity authentication by the gateway operator server, by comparing the registered numbers of the gift certificates or coupons with barcode data stored in a database of the barcode issuer, and transmitting, by the barcode issuer, an authentication result to the gateway operator server;
    exchanging, by the gateway operator server, the authenticated gift certificates or coupons for a corresponding heterogeneous barcode;
    transmitting, by the gateway operator server, the corresponding heterogeneous barcode to the user mobile device;
    when a request for use of the heterogeneous barcode is received from the user mobile device, scanning, by the affiliated store POS terminal, the heterogeneous barcode, and requesting, by the affiliated store POS terminal, the gateway operator server to approve the use of the heterogeneous barcode;
    checking, by the gateway operator server, validity of the heterogeneous barcode and transmitting a result of the use approval to the affiliated store POS terminal; and
    settling a corresponding amount of money corresponding to the approved heterogeneous barcode, wherein the heterogeneous barcode is an integrated mobile barcode corresponding to one of the authenticated gift certificates or coupons and includes a prefix identifying the barcode issuer and One Time Password (OTP) code information.

5. The method according to claim 4, further comprising:
settling, by the gateway operator server, approval contents of a heterogeneous barcode used as sale money of goods sold in an affiliated store and transmitting, by the gateway operator server, the settled approval contents to the affiliated store and the barcode issuer.

6. The method according to claim 5, wherein the gift certificates or coupons include a pre-paid card and a credit card.

* * * * *